United States Patent [19]

Lamarche et al.

[11] 4,262,545

[45] Apr. 21, 1981

[54] ACOUSTIC FLUID VELOCITY MEASURING SYSTEM

[75] Inventors: Michel Lamarche, Laval; Dimitri Petrov, Montreal; Arthur E. Maine, Kirkland, all of Canada

[73] Assignee: The Bendix Corporation, Teterboro, N.J.

[21] Appl. No.: 22,555

[22] Filed: Mar. 21, 1979

[51] Int. Cl.³ .............................................. G01F 1/66
[52] U.S. Cl. ................................. 73/861.27; 73/189
[58] Field of Search .................... 73/181, 189, 194 A, 73/861.27

[56] References Cited

U.S. PATENT DOCUMENTS

| 2,669,121 | 2/1954 | Garman et al. ................... 73/194 A |
| 3,978,726 | 9/1976 | Shih ....................................... 73/189 |
| 4,003,256 | 1/1977 | Donela et al. ...................... 73/194 A |

FOREIGN PATENT DOCUMENTS

| 805016 | 11/1958 | United Kingdom ................. 73/194 A |
| 236877 | 2/1969 | U.S.S.R. .................................... 73/189 |

OTHER PUBLICATIONS

J. H. Stichman—"A Sonic Velometer"—IEEE Transactions on Instrumentation and Measurement, vol. I.M.-23, No. 3, pp. 203–210, Sep. 1974.

*Primary Examiner*—Charles A. Ruehl
*Attorney, Agent, or Firm*—Anthony F. Cuoco; William F. Thornton

[57] ABSTRACT

An acoustic fluid velocity measuring system includes mutually perpendicular arms disposed in the direction of the rectangular components of the fluid velocity, with each arm supporting two transmitting and two receiving electro-acoustic transducers. Pulses of ultrasonic energy are transmitted and received in and against the direction of fluid flow. The transducers in each arm are arranged in separate electrical loops, each of which provides an output at a different frequency. The frequencies are compared to measure fluid speed and direction which appear on a digital display. The measurements are independent of ambient temperature and the transducers are heated so that the system operates under ice forming meteorological conditions.

4 Claims, 6 Drawing Figures

ACOUSTIC FLUID VELOCITY MEASURING SYSTEM

FIELD OF THE INVENTION

This invention relates generally to fluid velocity measuring systems and in particular to an acoustic fluid velocity measurement system which transmits pulses of ultrasonic energy in and against the direction of fluid flow. More particularly, this invention relates to a system of the type described for measuring wind speed and direction.

DESCRIPTION OF THE PRIOR ART

Fluid velocity measuring systems utilize pairs of transducers for transmitting sound through the fluid. A pair of transducers is utilized to transmit sound in the direction of fluid flow and another pair is used to transmit sound in the opposite direction. The difference in transmission times in the one and the opposite directions has been used to compute the velocity of the fluid.

A particular requirement of fluid velocity measuring systems used particularly by electric power companies to measure wind speed and direction, is that the devices be operable during ice forming meteorological conditions.

Conventional instruments which are based on a propeller-driven tacho-generator, cease functioning when covered with ice. While these systems satisfy requirements where a lack of wind speed and direction data over a period of several hours can be tolerated, their use by electric power companies, on the other hand, is precluded since accurate data is required precisely at the time that the system does not work, in order to anticipate and prevent the collapse of ice-loaded power lines as will be understood by those skilled in the art.

Ultrasonic systems for the purposes described are known in the art. One such device is disclosed and claimed in U.S. Pat. No. 4,003,256, issued on Jan. 18, 1977, to A. Mark Donelan and Bryan F. White and assigned to Canadian Patents and Development Limited, Ottawa, Canada. This system utilizes continuous ultrasonic wave transmission to achieve the desired results. Another such system is marketed by Weather Measurement Corporation, Sacramento, California, as their W117 Ultrasonic Anemometer-Thermometer.

The prior art systems suffer from one or more of the following disadvantages: first, they do not incorporate a de-icing feature, which makes them inoperative when used to measure wind velocity under the aforenoted meteorological conditions; and, second, the measurement of fluid velocity depends on the time of travel of an ultrasonic pulse from a transmitting to a receiving transducer. The accuracy of the measurement thus depends on ambient temperature. The error due to ambient temperature is significant and the systems are not compensated for this error. The system of the present invention as will be herein described is an improvement over the prior art systems in that the transducers are heated to prevent ice build-up and the measurement of fluid velocity is independent of ambient temperature to provide a more accurate instrument as will hereinafter become evident.

SUMMARY OF THE INVENTION

This invention contemplates an acoustic fluid velocity measuring system which includes mutually perpendicular arms disposed in the direction of the rectangular components of the fluid velocity, with each arm supporting two transmitting and two receiving electro-acoustic transducers. Output pulses from the receiving transducers generated during a given sampling period are stored and a micro-computer calculates the rectangular components of the fluid velocity vector, and which calculation is based on the frequency of the pulses. This is followed by a determination of fluid speed and fluid direction. Elaborate acoustic isolation between transducers can be avoided by operating the system at two different frequencies. It is emphasized that the transmitting frequencies of the system are asynchronous and that all calculations are performed by the micro-computer with the number of pulses stored during a fixed sampling period. The device to be herein described is advantageous over prior art devices for like purposes in that it has no moving parts, it operates under ice forming conditions and the outputs from the transducers are digital so that they can be easily processed by a micro-computer. Further, the measurements are independent of ambient temperature to impart a high degree of accuracy to the system.

DESCRIPTION OF THE INVENTION

Figure 1:
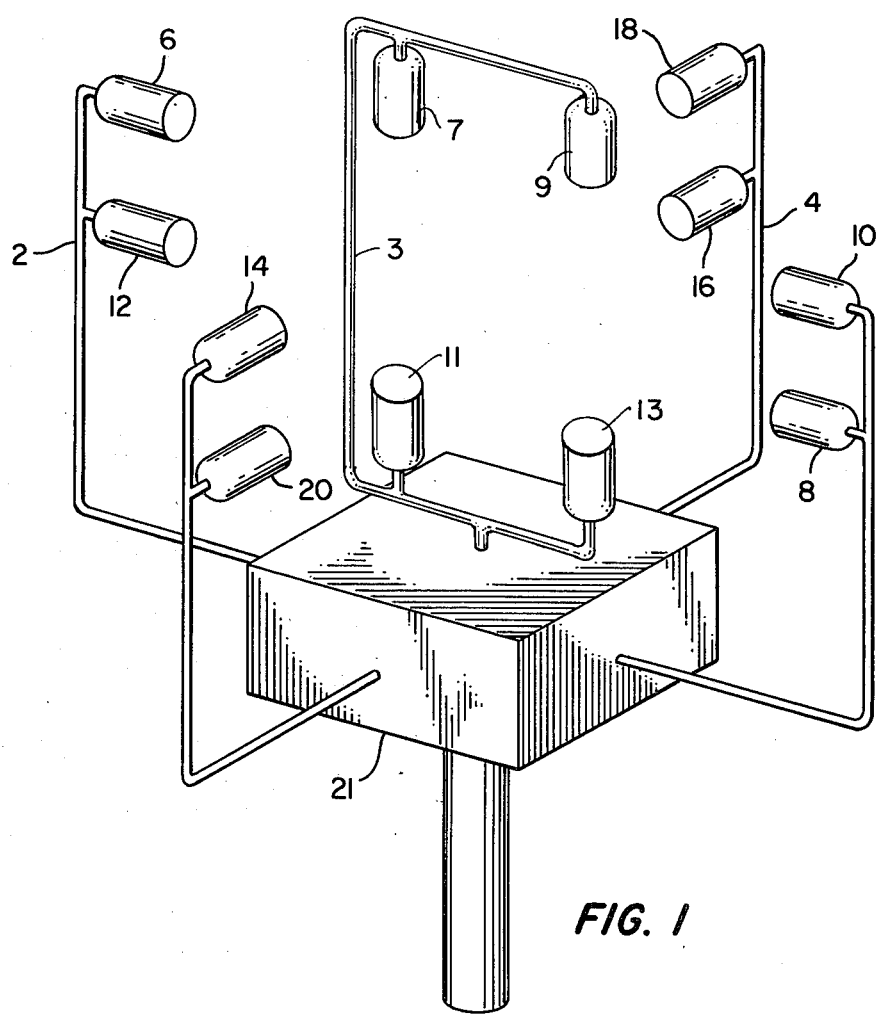
FIG. 1 is a diagrammatic isometric representation showing the external configuration of the acoustic fluid velocity measuring system of the invention.
Figure 2:
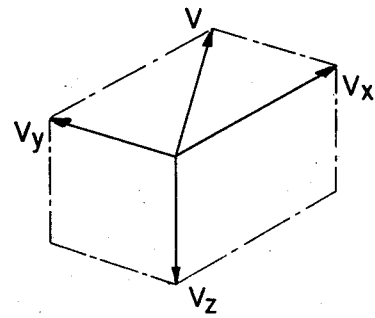
FIG. 2 is a vector diagram indicating the rectangular components of the fluid velocity vector.
Figure 6:
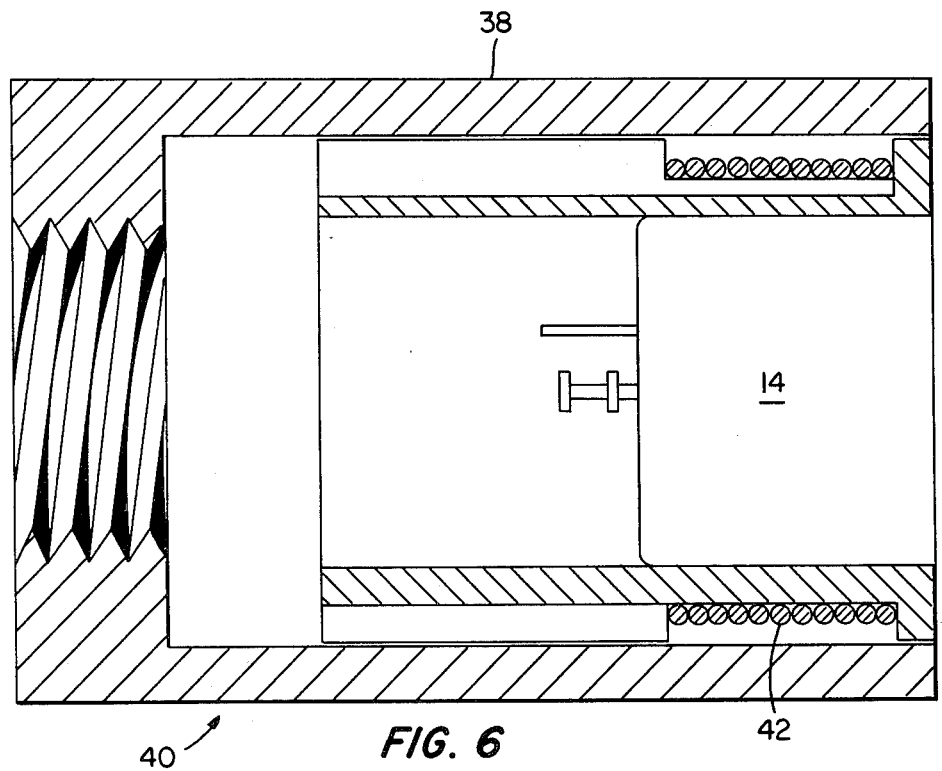
FIG. 6 is a plan view showing a head assembly including a transducer having a heating element associated therewith for satisfying the purposes of the invention.
Figure 4:
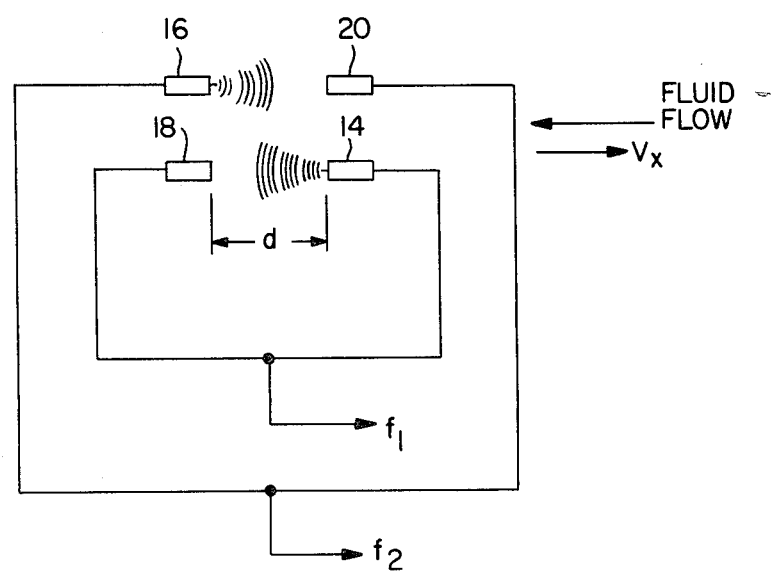
FIG. 4 is a block diagram showing the operating principle of the acoustic fluid velocity measuring system shown generally in FIG. 1.

With reference first to FIG. 1, the acoustic field velocity measuring system to be described herein includes at least two arms designated by the numerals 2 and 4. Each arm carries four electro-acoustic transducers, two of which are transmitting transducers and two of which are receiving transducers. The transducers are electrically heated as shown in FIG. 6 and to be hereinafter described. Thus, arm 2 carries transmitting Transducers 6 and 8 and receiving transducers 10 and 12 while arm 4 carries transmitting transducers 14 and 16 and receiving transducers 18 and 20. The transducers are in a cooperative arrangement in and against the direction of fluid flow as shown in FIG. 4 for measuring the rectangular components $V_x$ and $V_y$ of a fluid velocity vector V as shown in FIG. 2. Another arm and cooperative arrangement of transducers may be included for measuring rectangular component $V_z$ as also shown in FIG. 2 and as will be understood by those skilled in the art.

Figure 3:
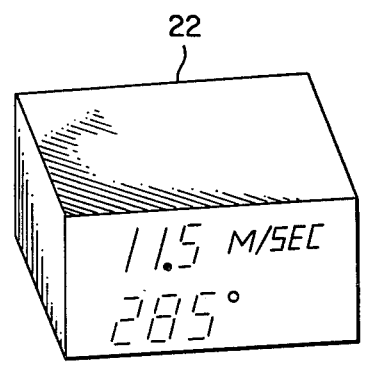
FIG. 3 is a diagrammatic isometric representation showing digital display means for displaying fluid speed and direction as measured by the system shown generally in FIG. 1.

Transducers 6, 8, 10, 12 and 14, 16, 18 and 20, are coupled through arms 2 and 4, respectively, to a circuit box designated generally by the numeral 21. Circuit box 21 includes an appropriate oscillator, transmitter transducer drivers, receiver transducer preamplifiers, a counter, a thermostat and suitable connecting members for operation of the device of the invention as illustrated in FIG. 4. Calculated fluid speed and direction are displayed on a digital display device 22, as illustrated in FIG. 3.

The operating principle of the invention is illustrated in FIG. 4, wherein fluid velocity component $V_x$ along the sensitive axis of arm 4 is added to the ultrasonic velocity propagation in the direction defined by transmitting transducer 14 and receiving transducer 18 and subtracted from it in the direction defined by transmitting transducer 16 and receiving transducer 20. Thus, two transducer loops are formed providing outputs at frequencies $f_1$ and $f_2$, respectively. For purposes of illustration, the invention will be described with reference to fluid velocity component $V_x$, with the same description being applicable to fluid velocity components $V_y$ and $V_z$ shown in FIG. 2.

With the arrangement shown in FIG. 4, each of the transmitting transducers 14 and 16 may be energized by a 40 KHZ oscillator (FIG. 5) to provide digital ultrasonic acoustic pulse bursts of 10 periods at 40 KHZ. In this connection it is noted that transducers 14, 16, 18 and 20 may be of the type marketed by the Massa Division, Dynamics Corporation of America, Kingham, Massachusetts, under their trade designation Type R-290. The transducers are available at resonant frequencies of 23 KHZ and 40 KHZ. Thus, the two transducer loops referred to above can be operated at two different frequencies, i.e., 23 KHZ and 40 KHZ. This provides acoustic isolation between transmitting transducer 14 and receiving transducer 20, and between transmitting transducer 16 and receiving transducer 18, without an otherwise elaborate arrangement, which enhances the invention as will be understood by those skilled in the art.

In order to appreciate the advantages of the invention, it is noted that $V_x$ (as well as $V_y$ and $V_z$) may be measured by one of two ways, the first being by comparing the ultrasonic propagation times as will be next described.

The propagation time $t_1$ from transducer 14 to transducer 18 is:

$$t_1 = \frac{d}{c + V_x} ; \qquad (1)$$

The propagation time $t_2$ from transducer 16 to transducer 20 is:

$$t_2 = \frac{d}{c - V_x} ; \qquad (2)$$

where c is the speed of sound and d is the distance between the transducers (FIG. 4).

by combining equations (1) and (2) we obtain:

$$t_2 - t_1 = \frac{d}{c - V_x} - \frac{d}{c + V_x} ; \text{ or} \qquad (3)$$

$$t_2 - t_1 = \frac{2V_x d}{c^2 - V_x^2} \qquad (4)$$

Considering, for purposes of illustration, that the device of the invention is used to measure wind speed and direction, under normal atmospheric conditions the speed of sound c is equal to 331 m/sec. while the highest wind speed $V_x$ is about 100 knots or 51.5 m/sec. When these numerical values are substituted into equation (4) it becomes apparent that in the worst case the maximum error in neglecting $V_x^2$ is 2.7% so that equation (4) can be approximated by:

$$t_2 - t_1 = \frac{2V_x d}{c^2} ; \text{ and} \qquad (5)$$

$$V_x = \frac{c^2(t_2 - t_1)}{2d} \qquad (6)$$

Assuming that the distance d between the transmitting and receiving transducers is 0.4 m and that the wind speed is 15.0 m/sec. (approximately 10 knots), the propagation times computed from equations (1) and (2) are $t_1 = 1.19$ msec. and $t_2 = 1.23$ msec. Therefore, the time difference which is used to compute $V_x$ from equation (6) is $t_2 - t_1 = 0.04$ msec. and can be easily measured.

However, the disadvantage of this measurement is that it is a function of the speed of sound c, which in turn depends on temperature, in accordance with the following:

$$c^2 = \frac{\gamma P_o}{\rho} ; \qquad (7)$$

where
Y: ratio of specific heat at constant pressure to that at constant volume
$P_o$: static pressure
$\rho$: density of air.

The latter quantity depends on atmospheric pressure and ambient temperature:

$$\rho(\text{gm/cm}^3) = \frac{0.001293}{1 + 0.003677T} \frac{P_o}{76} \qquad (8)$$

where
$P_o$: atmospheric pressure in cm of mercury
T: temperature in °C.

Substituting equation (8) into (7):

$$c^2 = \frac{(1 + 0.003677T)}{0.001293} 76\gamma \qquad (7a)$$

Since, according to equation (6), wind speed $V_x$ is proportional to the square of the speed of sound c, the measurement of $V_x$ will contain errors unless there is an accurate compensation for ambient temperature variations which complicates the system as will be understood by those skilled in the art.

Figure 5:
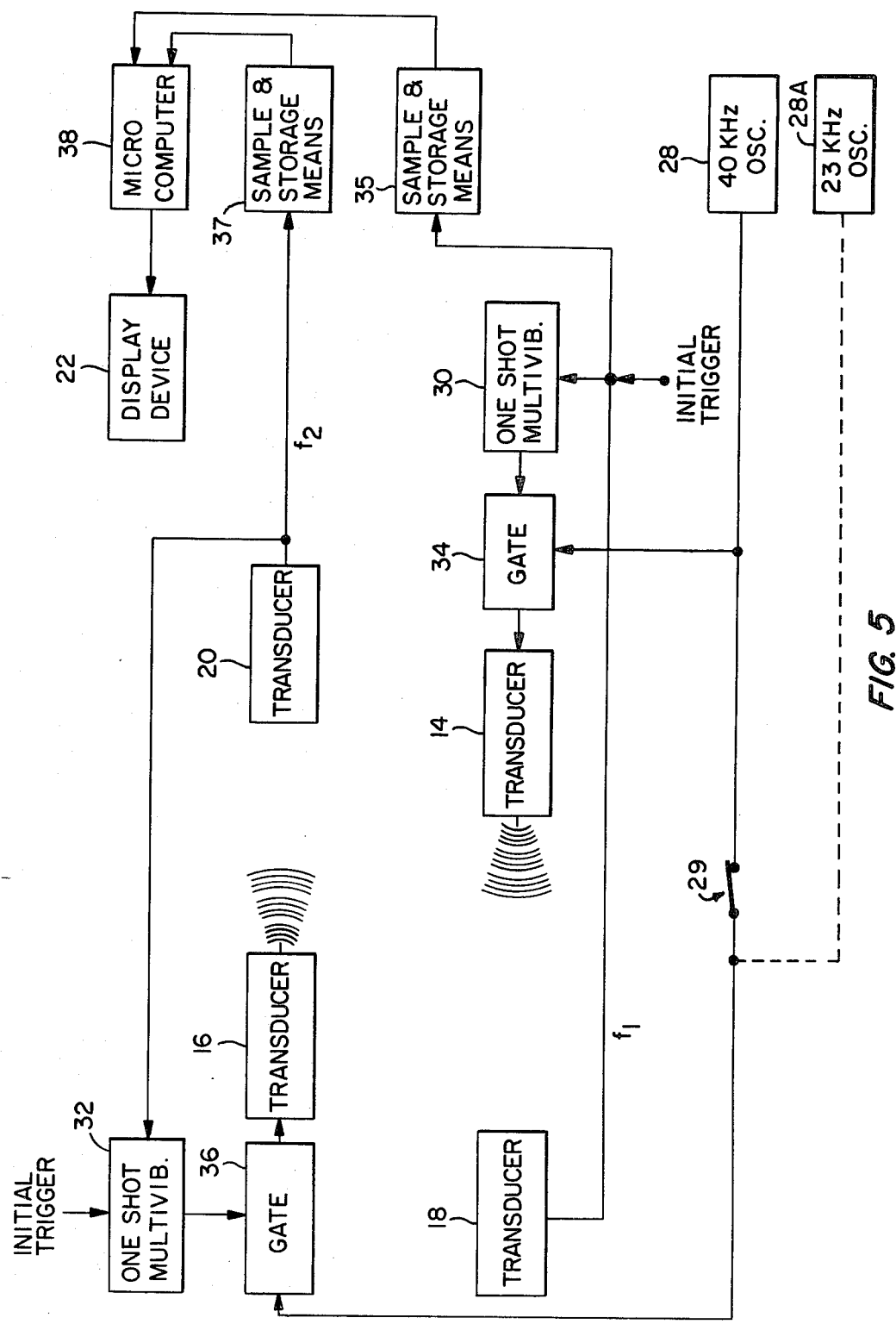
FIG. 5 is a block diagram showing the electronic configuration of the acoustic fluid velocity measuring system of the invention.

Another preferred way of measuring $V_x$ (or $V_y$ and $V_z$) is by frequency comparison. It will be assumed that initially transmitting transducers 14 and 16 are excited simultaneously by a 40 KHZ oscillator 28 which triggers one shot multivibrators 30 and 32 for opening gates 34 and 36, respectively, as shown in FIG. 5. As soon as the ultrasonic burst from transmitting transducer 14 arrives at receiving transducer 18 after a time $t_1$, in accordance with equation (1)), transducer 18 triggers one shot multivibrator 30 which provides a pulse for opening gate 34 to generate a new ultrasonic burst. The same sequence applies to the loop including transmitting transducer 16 and receiving transducer 20, so that two periodic sequences are generated having frequencies $f_1$ and $f_2$ given by the following equations:

$$f_1 = \frac{1}{t_1} = \frac{c + V_x}{d} \tag{9}$$

$$f_2 = \frac{1}{t_2} = \frac{1}{t_2} = \frac{c - V_x}{d} \text{; and} \tag{10}$$

$$f_1 - f_2 = \frac{2V_x}{d} \tag{11}$$

$$V_x = \frac{(f_1 - f_2)d}{2} \tag{12}$$

It is apparent from the above that by computing fluid velocity by frequency comparison, the computation is independent of ambient temperature and is therefore more accurate than the propagation time comparison computation. Assuming, as previously, a windspeed of 15 m/sec (approximately 10 knots) the frequencies computed from equations (9) and (10) are $f_1 = 840.3$ Hz and $f_2 = 813.0$ Hz. Both quantities can be easily measured with good accuracy so that there is no problem in computing $V_x$ from equation (12).

With further reference to FIG. 5, which is illutrative of the preferred frequency comparison computation of velocity, digital pulses from receiving transducers 18 and 20 are stored in sampling and storage means 35 and 37, respectively. A conventional type micro-computer 38 calculates the wind velocity components $V_x$ and $V_y$ in accordance with equation 12. This is followed by calculating wind speed V and wind direction $\theta$ from the following expressions:

$$V = \sqrt{V_x^2 + V_y^2} \tag{13}$$

$$\theta = \arctan \frac{V_x}{V_y} \tag{14}$$

V and $\theta$ are digitally displayed on display device 22 (FIG. 2).

It is to be noted that all four transmitting transducers are excited from the same 40 KHZ oscillator. The four transmitting frequencies in the two arms of the device are asynchronous and all calculations are performed with the number of pulses stored in sampling storage means 35 and 37 during a fixed sampling period. In order to avoid the aforenoted elaborate acoustic isolation arrangement, one 40 KHZ exciting oscillator 28 and one 23 KHZ exciting oscillator 28A may be used through a switch 29, shown as closed in FIG. 5, being opened.

As heretofore noted, an important feature of the invention is that it operates under sleet or ice forming conditions. This is accomplished by heating the transducers which prevent ice build up thereon as will be understood by those skilled in the art.

FIG. 6 shows a typical transducer head 40 used for the purposes of the invention and including, for example, transducer 14 which is a commercially available transducer as heretofore noted. The transducer is modified by winding heating element 42 thereon as shown in the Figure. The heating element consists of a ni-chrome wire in a fiber glass flexible tube. It is controlled by an electronic thermostat, (not shown but included in box 21, FIG. 1) which is switched on between +2° and −10° C. when icing conditions are likely to occur.

It will now be understood that the acoustic fluid velocity measuring device of the invention has distinct advantages in that it has no moving parts, operates under icing conditions and provides digital outputs which can be easily processed by a microcomputer. Moreover, the measurement of wind speed and wind direction is independent of ambient temperature. All of the above features represent a distinct advantage over like devices now known in the art. Since no moving parts are involved, as in conventional fluid velocity measuring systems, the disclosed system may be used in desert type or the like atmospheric conditions wherein the penetration of dust and/or sand into ball bearings would decrease the reliability of the conventional systems. Further, the addition of an arm to measure fluid velocity component $V_z$ makes the system suitable for airport installation where knowledge of component $V_z$ is an asset as will be understood.

What is claimed is:

1. A fluid velocity measuring system, comprising:

a first arrangement including two transmitting and two receiving electro-acoustic transducers disposed in a first direction;

a second arrangement including two transmitting and two receiving electro-acoustic transducers disposed in a second direction;

the first and second directions commensurate with rectangular components of the fluid velocity;

the transducers in each of the first and second arrangements arranged in two separate electrical loops, each of the loops including a transmitting transducer and a receiving transducer, with the transmitting and receiving transducers heated during ice forming meteorological conditions;

the two electrical loops in each of the first and second arrangements being operated at different frequencies to provide acoustic isolation between the transmitting transducer in one loop and the receiving transducer in the other loop;

means for energizing the transmitting transducers in each of the loops to generate and transmit acoustic pulse bursts which are received by the receiving transducers in the respective loops;

the transducers in one loop arranged so that the acoustic pulse bursts are transmitted and received in the direction of a rectangular component of fluid velocity and the transducers in the other loop arranged so that the acoustic pulse bursts are transmitted and received in the opposite direction;

the receiving transducers responsive to the received acoustic pulse bursts for providing loop pulse outputs, with the outputs from each of the loops being at a different frequency; and means responsive to the loop pulse outputs at different frequencies for determining fluid velocity.

2. A fluid velocity measuring system as described by claim 1, including:

display means connected to the means responsive to the loop pulse outputs at different frequencies for displaying the determined fluid speed and direction.

3. A fluid velocity measuring system as described by claim 1, including:

a third arrangement including two transmitting and two receiving transducers disposed in a third direction; and the first, second and third directions commensurate with rectangular components of the fluid velocity.

4. A fluid velocity measuring system comprising:

a first arrangement including two transmitting and two receiving electro-acoustic transducers disposed in a first direction;

a second arrangement including two transmitting and two receiving electro-acoustic transducers disposed in a second direction;

a third arrangement including two transmitting and two receiving electro-acoustic transducers disposed in a third direction;

the first, second and third directions commensurate with the rectangular components of the fluid velocity;

the transducers in each of the first, second and third arrangements arranged in two separate electrical loops, each of the loops including a transmitting transducer and a receiving transducer, with the transmitting and receiving transducers heated during ice forming meteorological conditions;

the two electrical loops in each of the first, second and third arrangements being operated at different frequencies to provide acoustic isolation between the transmitting transducer in one of the loops and the receiving transducer in the other loop;

means for energizing the transmitting transducers in each of the loops to generate and transmit acoustic pulse bursts which are received by the receiving transducers in the respective loops;

the transducers in one loop arranged so that the acoustic pulse bursts are transmitted and received in the direction of a rectangular component of fluid velocity and the transducers in the other loop arranged so that the acoustic pulse bursts are transmitted and received in the opposite direction;

the receiving transducers responsive to the received acoustic pulse bursts for providing loop pulse outputs, with the outputs from each of the loops being at a different frequency; and means responsive to the loop pulse outputs at different frequencies for determining fluid velocity.

* * * * *